US006444275B1

(12) United States Patent
Kuhman et al.

(10) Patent No.: US 6,444,275 B1
(45) Date of Patent: Sep. 3, 2002

(54) METHOD FOR REMOTE PLASMA DEPOSITION OF FLUOROPOLYMER FILMS

(75) Inventors: Daniel E. Kuhman, Fairport, NY (US); Christopher Constantine, Safety Harbor; Kevin N. Beatty, St. Petersburg, both of FL (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/699,413

(22) Filed: Oct. 31, 2000

Related U.S. Application Data

(62) Division of application No. 08/673,535, filed on Jul. 1, 1996, now Pat. No. 6,243,112.

(51) Int. Cl.[7] ............................ C08J 7/18; B05D 3/06; H05H 1/46

(52) U.S. Cl. ........................ 427/490; 427/562; 427/577

(58) Field of Search ................................ 427/490, 577, 427/562

(56) References Cited

U.S. PATENT DOCUMENTS 4,335,389 A 6/1982 Shirato et al.

(List continued on next page.)

FOREIGN PATENT DOCUMENTS

| | | |
|---|---|---|
| EP | 0 355 862 | 2/1990 |
| EP | 0 367 438 | 5/1990 |
| EP | 0 531 535 A1 | 8/1992 |
| EP | 0 539 947 | 5/1993 |
| EP | 0 585 854 | 3/1994 |
| JP | 56-89569 | 7/1981 |
| JP | 63-122550 | 5/1988 |
| JP | 63-122557 | 5/1988 |
| JP | 63-122559 | 5/1988 |
| JP | 63-122560 | 5/1988 |
| JP | 04-339656 | 11/1992 |
| JP | 05-116309 | 5/1993 |
| JP | 05-124199 | 5/1993 |
| JP | 05-286137 | 11/1993 |
| JP | 05-330060 | 12/1993 |
| JP | 05-330063 | 12/1993 |
| JP | 05-338180 | 12/1993 |
| JP | 05-345419 | 12/1993 |
| JP | 06-8448 | 1/1994 |
| JP | 06-122204 | 5/1994 |
| JP | 06-155748 | 6/1994 |
| JP | 06-155752 | 6/1994 |

OTHER PUBLICATIONS d'Agostino, R. et al., "Plasma Polymerization of Fluorocarbons," 1990, pp. 95–162. Chapter 2 unknown book or source, No month given.

(List continued on next page.)

*Primary Examiner*—Marianne Padgett
(74) *Attorney, Agent, or Firm*—Oliff & Berridge, PLC

(57) ABSTRACT

A thermal ink jet printhead contains, on a front face, a remote plasma deposited fluoropolymer film. The fluoropolymer film has a high fluorine to carbon ratio. The film also possesses excellent mechanical durability. The film may be prepared by forming a remote plasma from precursor gases containing flurocarbons and depositing from the remote plasma onto a front face of a thermal ink jet printhead

12 Claims, 7 Drawing Sheets

HIGH DENSITY REMOTE PLASMA PROCESSING SYSTEM UTILIZING A MICROWAVE ELECTRON CYCLOTRON RESONANCE PLASMA SOURCE.

U.S. PATENT DOCUMENTS

| | | | | | |
|---|---|---|---|---|---|
| 4,368,476 A | | 1/1983 | Uehara et al. | | |
| 4,639,948 A | | 2/1987 | Adell | | |
| 4,643,948 A | | 2/1987 | Diaz et al. | | |
| 4,661,409 A | | 4/1987 | Kieser | | |
| 4,663,640 A | | 5/1987 | Ikeda | | |
| 4,698,256 A | | 10/1987 | Giglia et al. | | |
| 4,740,263 A | | 4/1988 | Imai et al. | | |
| 4,770,966 A | | 9/1988 | Kazama et al. | | |
| 4,847,639 A | | 7/1989 | Sugata et al. | | |
| 4,864,329 A | | 9/1989 | Kneezel et al. | | |
| 5,017,946 A | | 5/1991 | Masuda et al. | | |
| 5,043,747 A | | 8/1991 | Ebisawa et al. | | |
| 5,073,785 A | * | 12/1991 | Jansen et al. | | |
| 5,136,310 A | | 8/1992 | Drews | | |
| 5,208,606 A | | 5/1993 | Klein et al. | | |
| 5,218,381 A | | 6/1993 | Narang et al. | | |
| 5,230,926 A | | 7/1993 | Narang et al. | | |
| 5,266,363 A | * | 11/1993 | Yamazaki | .................. | 427/577 |
| 5,312,517 A | | 5/1994 | Ouki | | |
| 5,434,606 A | | 7/1995 | Hindagolla et al. | | |
| 5,525,392 A | * | 6/1996 | Baum et al. | ................ | 427/490 |
| 5,679,460 A | | 10/1997 | Schakenraad et al. | | |
| 5,759,635 A | | 6/1998 | Logan | | |
| 5,876,753 A | | 3/1999 | Timmons et al. | | |
| 5,900,288 A | * | 5/1999 | Kuhman et al. | ............ | 427/490 |
| 6,051,321 A | * | 4/2000 | Lee et al. | .................. | 427/490 |
| 6,110,542 A | * | 8/2000 | Miyanaga et al. | .......... | 427/577 |
| 6,132,813 A | * | 10/2000 | Chan et al. | ................ | 427/490 |
| 6,211,065 B1 | * | 4/2001 | Xi et al. | ..................... | 427/490 |
| 6,243,112 B1 | * | 6/2001 | Kuhman et al. | .............. | 347/45 |

OTHER PUBLICATIONS

Pavlath, Attila E. et al., "Plasma Deposition of Fluorinated Compounds," *Plasma Polymerization of Organometallic Systems*, Chapter 11, received Mar. 29, 1979, pp. 181–192. No publication date.

Morosoff, N. et al., Plasma Polymerization of Tetrafluoroethylene in a Capacitively Coupled Discharge with Internal Electrodes, *Plasma Polymerization of Organometallic Systems*, Chapter 10, received Mar. 29, 1979, pp. 163–179. No publication date.

O'Kane, D. F. et al., "Preparation and Characterization of Glow Discharge Fluorocarbon–Type Polymers," *J. Macromol. Sci.—Chem.*, A10(3), 1976, pp. 567–577. No Month.

Millard, M. M. et al., "Plasma Synthesis of Fluorocarbon Films", *Journal of Applied Polymer Science*, vol. 17, 1973, pp. 2501–2507. No Month.

* cited by examiner

DIRECTIONALITY "PROBLEM":
OFF-AXIS FLIGHT CAUSES SPOT MISPLACEMENT.
$D_{ERROR} = V_{O/A} \times D_P \div V_D$

DROP EJECTION PROCESS AND NATURE
OF MISDIRECTIONALITY FOR INK JET PRINTHEAD

PARALLEL PLATE SYSTEM FOR DIRECT PLASMA PROCESSING.

HIGH DENSITY REMOTE PLASMA PROCESSING SYSTEM UTILIZING A MICROWAVE ELECTRON CYCLOTRON RESONANCE PLASMA SOURCE.

ADVANCING CONTACT ANGLE VERSUS NUMBER OF MECHANICAL WIPES FOR VARIOUS FRONT FACE COATING MATERIALS

RECEDING CONTACT ANGLE VERSUS NUMBER OF MECHANICAL WIPES FOR VARIOUS FRONT FACE COATING MATERIALS

EFFECT OF SUBSTRATE MATERIAL FOR HIGH DENSITY REMOTE FLUOROPOLYMER LAYER (ADVANCING CONTACT ANGLE VS. NUMBER OF MECHANICAL WIPES)

METHOD FOR REMOTE PLASMA DEPOSITION OF FLUOROPOLYMER FILMS

This is a Division of Application No. 08/673,535 filed Jul. 1, 1996 now U.S. Pat. No. 6,243,112. The entire disclosure of the prior application(s) is hereby incorporated by reference herein in its entirety.

BACKGROUND OF THE INVENTION

This invention relates to a remote plasma deposited fluoropolymer film, and more particularly to a high density remote plasma deposited fluoropolymer film. The present invention also relates to a fluoropolymer film formed on the front face of a thermal ink jet printhead and a method for forming the fluoropolymer film, particularly on the front face of a thermal ink jet printhead.

In existing tbermal ink jet printing, the printhead comprises one or more ink filled channels, such as disclosed in U.S. Pat. No. 4,463,359, to Ayata et al. At one end, these channels communicate with a relatively small ink supply chamber. At the opposite and, the channels have an opening referred to as a nozzle. A thermal energy generator, for example a resistor, is located in each of the channels a predetermined distance from the nozzles. The resistors are individually addressed with a current pulse to momentarily vaporize ink in the respective channels and thereby form an ink bubble. As the bubble grows, the ink bulges from the nozzle, but it is contained by the surface tension of the ink an a meniscus. As the bubble begins to collapse, the ink still in the channel between the nozzle, and bubble starts to move towards the collapsing bubble causing a volumetric contraction of the ink at the nozzle resulting in the separation of the bulging ink as an ink droplet. The acceleration of the ink out of the nozzle while the bubble is growing provides momentum and velocity towards a recording medium, such as paper.

The specific details of the separation of the ink from its physical surroundings, the ink channel, and its orifice determine to a large extent the direction in which the ink will travel to the paper and thus where the mark on the paper will be made. Any microscopic irregularity that would affect the isotropy of this ink/orifice separation process will usually cause the ink to travel in an uncontrolled and unintended direction, that is, for example, not orthogonal to the plane defined by the front face. This results in poor quality of the images and text that are printed on the paper. Such irregularities include pools of ink that collect around the orifice from previous jet firing. For example, FIG. 1 demonstrates drop misdirectionality of an ink jet printhead. The amount of spot misplacement is a function of the off-axis velocity multiplied by the print distance divided by the nominal drop velocity. Thus, if any of these factors are affected, for example by microscopic irregularities at the ink orifice, the ink droplets will be misdirected as indicated in FIG. 1.

Microscopic irregularities can be avoided by providing a coating on the exit orifice that repels the ink that is used for the printing process. To avoid or minimize ink drop deflection problems that can lead to subsequently printed images of poor quality, the front face of ink jet devices may be coated, particularly around the nozzles, with one or more ink repellent layers.

Various ink repellent layers coated on the front face of a thermal ink jet printhead are known in the art. Methods for coating the front face include spraying or dip coating hydrophobic liquids onto the front face of the printhead device or coating a material onto an intermediate substrate and then transferring the coated material onto the front face of the device using some combination of pressure and heat. Material can also be applied to the front face using vapor deposition methods such as chemical vapor deposition (CVD), plasma enhanced chemical vapor deposition (PECVD), sputtering or thermal evaporation.

U.S. Pat. No. 5,043,747 to Ebizawa et al. is directed to a polymer derivative compound of 1,3- or 1,4-bis (hexafluoroisopropyl)benzene, or 2,2-bisphenylhexafluoropropane used as the front face coating material and applied via intermediate substrate transfer.

JP-A-63-12256 (JP-A stands for a published unexamined Japanese Patent Application) discloses an ink repellent layer coated onto the surface or an elastic member and then subsequently transferred onto the surface of the ink jet device at the peripheral portion of the nozzles. JP-A-63-122557 discloses applying an ink repellent layer on a printhead device by dipping the printhead into an ink repellent agent while gas is jetted out through the openings. JP-A-63-122560, JP-A-63-122559, and JP-A-56-90569 disclose ink repellent agents containing fluorine atoms.

Plasma deposition, or glow discharge as it is often referred, is preferred due to its ease in allowing large batches of substrates, such as die modules, to be treated simultaneously, thus enabling high throughput. Uniformity of coating from device-to-device and batch-to-batch is also well controlled due to the relative sophistication of state-of-the-art plasma processing equipment.

Plasma treatment (also referred to as plasma surface modification) or plasma deposition of thin films may generally be performed in either of two processing setups: direct or remote. With direct plasma processing, film treatment or growth is within the plasma region. A typical apparatus as shown in FIG. 2 utilizes a parallel plate type reactor with the substrate 1 placed between electrodes 2 and 3 in a vacuum chamber 4 and resting on the lower electrode 2 and In contact with the plasma 5. With remote deposition, the substrates are removed from the plasma region. Reactive species created in the plasma must be transported to the substrate to deposit thereon. The affect of chamber pressure in determining the mean free path of these species, i.e., how far they can travel, is significant. The substrate may also be independently biased relative to the plasma to allow for control of energetic ion interaction with the film.

In addition to the relative location of the substrates during film treatment or growth, the nature of the plasma source is critical in determining the chemistry of species which interact with the film or substrate. Radio frequency (13.56 MHz) and direct current generated plasmas typically result in an ion end electron density of about $10^{10}/cm^3$ and neutral radical density of about $10^{14}/cm^3$. High density plasmas, such as those produced using microwave electron cyclotron resonance, inductive coupling and helicon wave generators result in electron/ion dominated plasmas with densities near $3\times10^{11}/cm^3$. These high densities can offer advantages with regard to subsequent material properties and processing times. The preparation of plasma deposited fluoropolymer films has been a topic of scientific experimentation for many years and is extensively summarized in *Plasma Deposition, Treatment and Etching of Polymers*, edited by R. D'Agostino, Acadmic Press, 1990, Chapter 2. In general, the higher the fluorine to carbon (F/C) ratio and the ore $CF_2$ and $CF_3$ type bonding, as compared with CF type bonding, the more hydrophobic the material and more effective the material is as an ink repellent front face coating. A —$CF_2$— bonding structure, as is found in polytetrafluoroethylene (PTFE), i.e. Teflon® (P/C equals 2), results in a low surface energy and makes the layer highly hydrophobic. Pure PTFE as it exists in its typical bulk film form however, cannot be plasma deposited. The use of such fluoropolymer films for thermal ink jet device front face coatings has been described in copending patent application Ser. No. 00/369,439. This application describes the use of a radio frequency generated plasma using various fluorocarbon gases to form a deposited fluoropolymer film on a substrate. Because the film is deposited as a bulk layer, the nature of the substrate is relatively unimportant in determining the ultimate surface energy properties of the fluoropolymer film and therefore the nature of the substrate is restricted only by the ability to obtain acceptable adhesion of the fluoropolymer film. This copending application describes the use of a parallel plate type system as in FIG. 2 for depositing such films. The limitation imposed by this process resides in the required chamber pressure necessary to sustain the radio frequency (rf) plasma and the reactive species which can be created due to the relatively low ion and electron density in the plasma. A chamber pressure of nearly 100 mTorr is typically required to ensure the stable operation of the plasma. At these pressures however, the mean free path of the reactive species created in the plasma is relatively short (typically<1 mm) leading to primarily gas phase collisions and polymerization. These polymerized products, although rich in fluorine content, deposit as a low density, poorly cross-linked material resulting in a film of poor mechanical properties.

In contrast, instead of depositing a bulk fluoropolymer film, a fluoropolymer layer can be created by modifying the surface of a substrate material using plasma processing. Whether surface modification or deposition of a fluoropolymer film occurs depends on the nature of the fluorocarbon source gas and other processing parameters such as substrate temperature, chamber pressure and applied power to the plasma. Such surface modification is discussed in *Plasma Surface Modification and Plasma Polymerization*, by N. Inagaki, Technomic Publishing Company, Inc, 1996, chapter 4.

However, U.S. Pat. No. 5,073,785 to Jensen et al., which is incorporated by reference herein in its entirety, discloses a process for minimizing or avoiding ink drop deflection in ink jet devices that comprises coating the front face of ink jet head components with an amorphous or diamond-like carbon layer. The amorphous or diamond-like carbon layer is subsequently fluorinated with a fluorine-containing gas by plasma enhanced chemical vapor deposition (PECVD) to render its surface stable and hydrophobic. Such a treatment does not deposit a coating, but merely modifies the physical and chemical properties of the exposed surface by the saturation of dangling bonds.

Further Jansen et al. discloses that fluorine can be incorporated into the material when PECVD is used as a deposition technique for the diamond-like carbon films once again lending to bulk deposited fluoropolymer films. Jansen et al. disclose that fluorinated gases can be used as precursor gases, but often require the presence of hydrogen. Jansen et al. does not disclose the types of fluorinated gases or the amount of hydrogen that may be used.

However, using the process of Jansen et al., only a limited concentration of fluorine can be achieved and the nature of its bonding is primarily CF instead of $CF_2$ or $CF_3$ because fluorine atoms are simply replacing hydrogen atoms on the surface or passivating unsaturated bonds. This is a result of the processing method employed by Jansen et al, namely direct plasma processing using a radio frequency generated plasma. Because the substrates are positioned within the plasma, all reactive species created are able to interact with the substrate in the surface modification reaction. The low electron density rf plasma creates primarily atomic fluorine atoms that accomplish this modification, resulting in the obtained surface stoichiometry. The lack of fluorine limits the level of hydrophobicity that can be obtained. A typical P/C ratio for fluorinated diamond-like carbon is about 0.3, with 80% of the fluorine incorporated as CF type bonds and only 20% as $CF_2$ and $CF_3$ type bonds.

However, these plasma processes do not provide a material that has sufficient hydrophobicity and mechanical durability. Accordingly, what is desired is a plasma processing method where a fluoropolymer layer, i.e., a surface modification of the substrate material is provided where a high concentration of CF2 and CF3 type bonding groups are incorporated into the matrix of the substrate material. This minimizes the deposition of a mechanically soft fluoropolymer film and provides a highly ink repellent film with excellent mechanical durability suitable for advanced thermal ink jet front face coating applications.

SUMMARY OF THE INVENTION

The present invention provides a coating layer that has increased hydrophobicity and is mechanically durable in order to increase the lifetime of the printhead. This layer in obtained through the surface modification of a substrate material and optional deposition of a fluoropolymer film over this surface modified layer.

The present invention further provides a substrate, particularly a thermal ink jet printhead comprising, on a front face, a remote plasma deposited fluoropolymer layer. The process can also be suitably used to obtain a fluoropolymer layer on a variety or other substrates, provided that a surface modification of the substrate material by the reactive fluorocarbon species created in the plasma is possible. Such substrates are typically organic in nature and include polyimides, polysulfones, polyethers and polyketones, but may include others as well. These substrates may be independent, i.e., in the form of a single bulk material; or coated or otherwise adhered to a supporting substrate which also accompanies the surfaces to be treated during the plasma processing. Such supporting substrates may be organic or inorganic in nature and may include for example single crystalline silicon, metals, glass and plastics or combinations thereof.

The present invention is further directed to a method for coating a substrate, particularly a thermal ink jet printhead, comprising a high density remote plasma, particularly a remote plasma having electron and ion densities greater than $10^{11}/cm^3$, for depositing fluorocarbon precursor gas reactive species on a front face of the substrate. This method utilizes a high density plasma source, such as microwave electron cyclotron resonance (ECR), inductive coupling or a helicon wave generator. These methods result in a high ion and electron density which can sustain the plasma at pressures as low as 1 mTorr. At these low pressures, radical mean free paths of reactive fluorocarbon species are maximized (about 10 cm) resulting in less gas phase polymerization and enhanced interaction with the substrate, which leads to excellent film durability. This method also isolates the substrate from the plasma so that selective preferred species within the plasma with suitable mean free paths may reach the substrate.

DETAILED DESCRIPTION OF PREFERRED EMBODIMENTS

An embodiment of the present invention is directed to a method for coating a front face of a substrate such as a thermal ink jet printhead by high density remote plasma enhanced chemical vapor deposition (PECVD) using fluorocarbon precursor gases. The precursor gases may include aliphatic fluoroalkanes and/or cyclical or unsaturated fluorocarbons.

An embodiment of this invention is directed to a substrate such as a thermal ink jet printhead comprising, on the front face, a layer such as diamond like carbon or other organic material whose surface is capable of being modified by exposure to species created within the plasma and subsequently further coated by these species if so desired.

Depending on the chemical nature of the precursor gas or gases, etching and surface modification of the substrate can be accomplished in addition to the deposition of a thin film. Furthermore, the substrate temperature, chamber pressure, frequency and level of electrical excitation and gas flow rate(s) may determine the composition and properties of the deposited layer. Using routine experimentation, one of ordinary skill in the art could adjust these factors in order to achieve the desired results.

In an embodiment of the present invention, high density remote plasma processing techniques are used to selectively dissociate the fluorocarbon source into reactive radical species, which may then passivate active bonding sites on the surface of the substrate. This can be accomplished by any remote plasma processing technique or apparatus utilizing a high density plasma source. For example, microwave plasma, microwave plasma coupled with electron cyclotron resonance (ECR), inductively coupled plasma or helicon wave generators, or the like are suitable. A preferred remote high density plasma technique is the microwave/ECR plasma technique.

Figure 1:
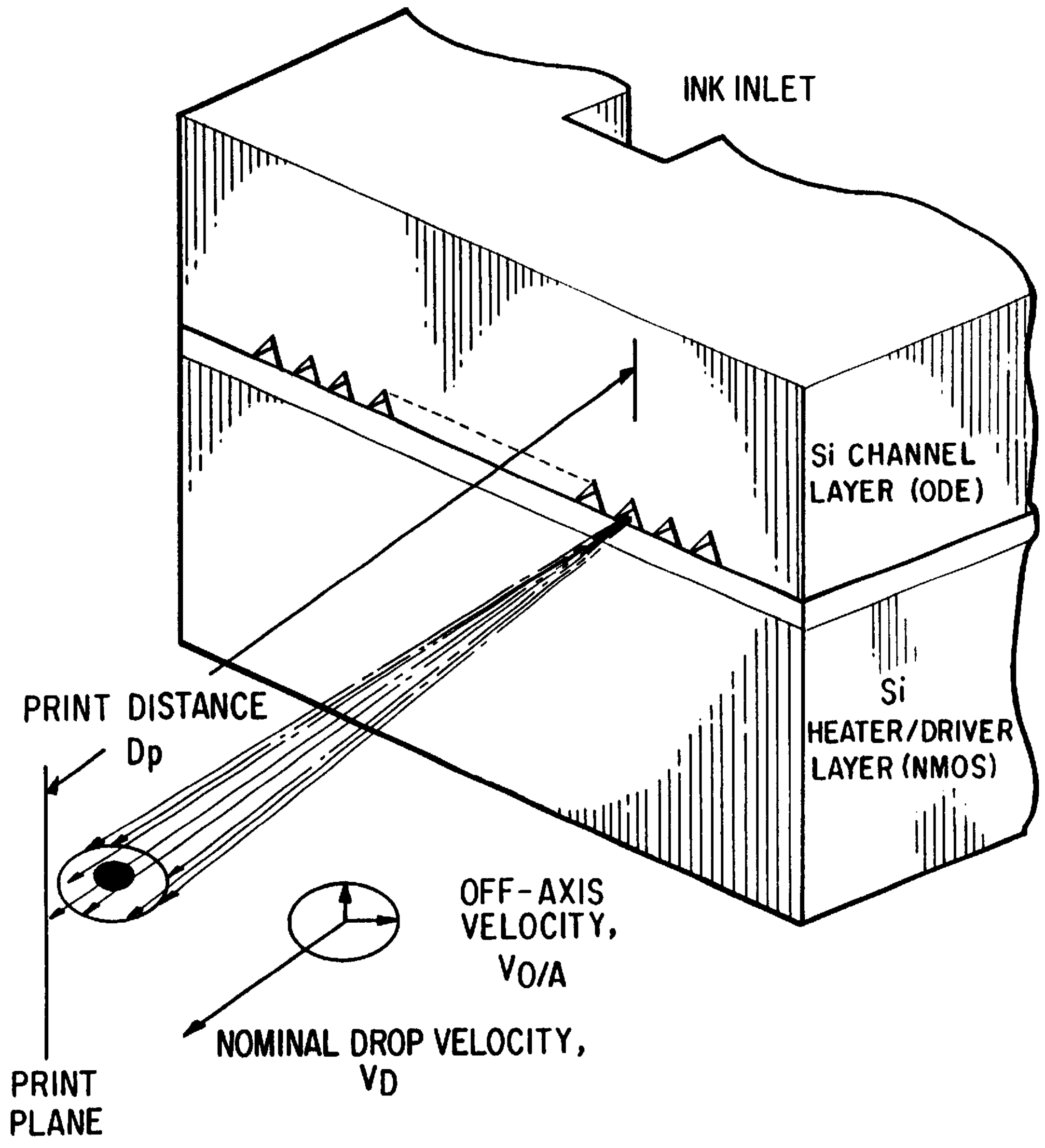
FIG. 1 demonstrates an ink jet printhead, the drop ejection process and the nature of misdirectionality.
Figure 2:
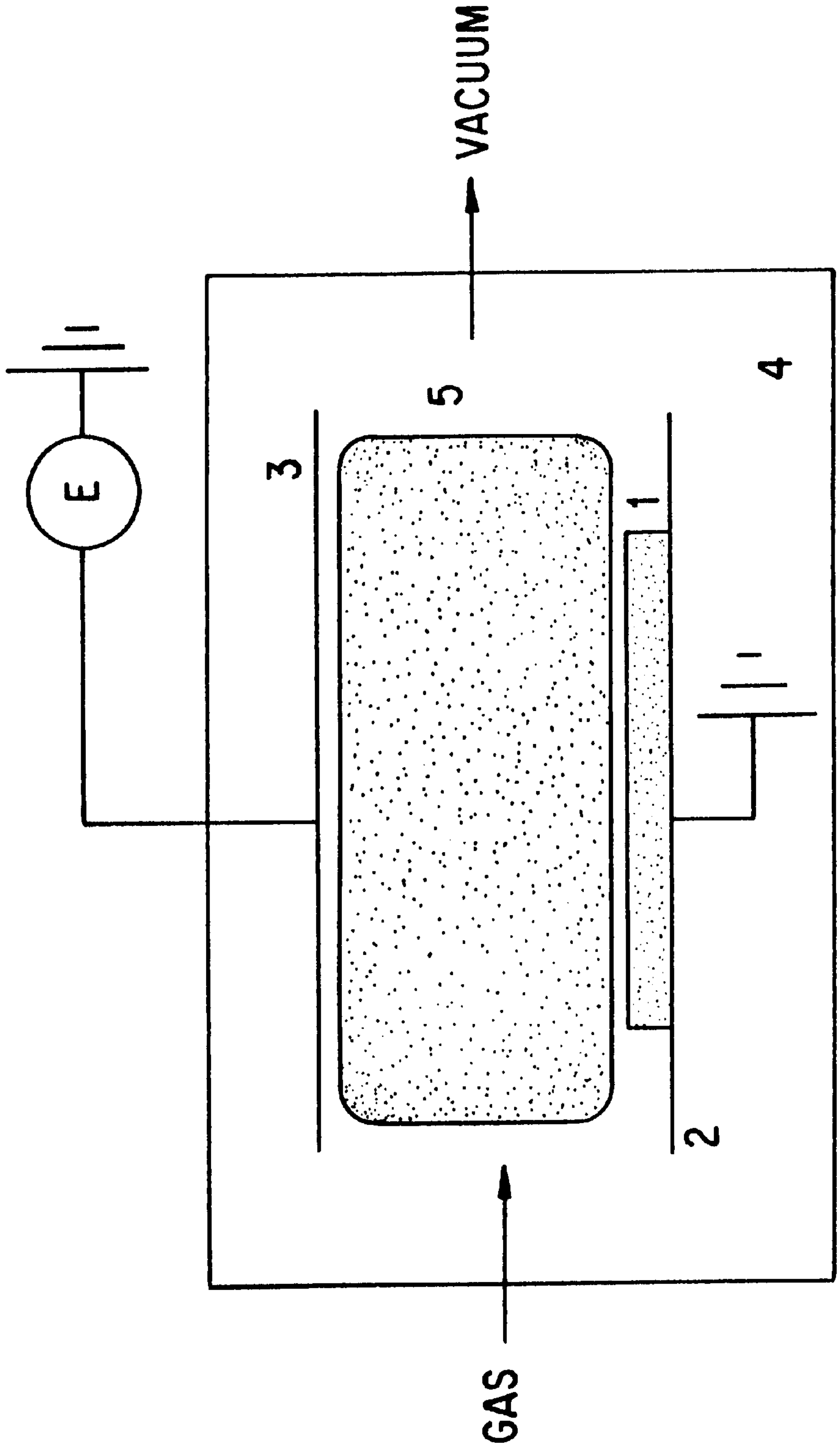
FIG. 2 illustrates a parallel plate system for direct plasma processing.
Figure 3:
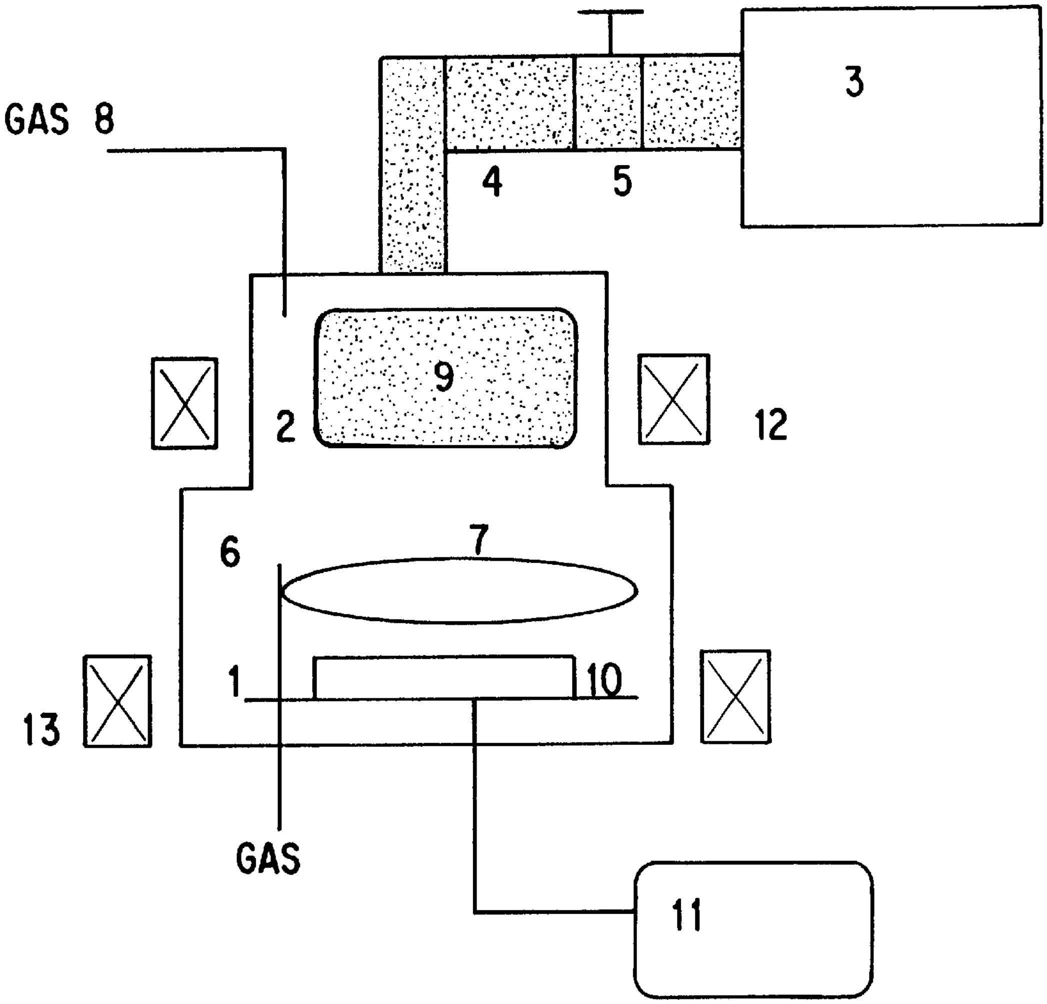
FIG. 3 illustrates a high density remote plasma processing system utilizing a microwave electron cyclotron resonance plasma source.

One configuration of a typical remote high density PECVD system is referred to as a Downstream Microwave/Elecron Cyclotron Resonance (ECR) system and is available for example from Plasma-Therm I.P., Inc (St. Petersburg, Fla.) under the model number SLR770-ECR. Such a system is shown in FIG. 3.

An electrode plate 1 is positioned in a lower vacuum chamber 6 with a gas dispersal ring 7 located thereover. The height of the low gas dispersal ring 7 is adjustable. The substrate 10 to be coated is placed in contact with the electrode plate 1. In an upper chamber 2, referred to as the microwave cavity, above and in communication with the lower chamber 6, a microwave generator 3 (operating at typically 2.45 GHz) coupled to a wave guide 4 and tuner 5 is used to maintain a plasma. Adjustable magnets 12 are used to couple the applied electric field with a magnetic field resulting in an electron cyclotron resonance (ECR) condition. In this state, electrons spiral within the upper chamber 2 with lower escape rates to the walls thereby resulting in a higher density of excited species (ion densities of about $3\times10^{11}/cm^3$) than is typically obtained in a non-ECR condition (ion density of about $1\times10^{10}/cm^3$). Once created, these species are transported to the lower chamber 6 (typically by diffusion) where they interact either directly with the substrate 10 or with gas(es) introduced through a lower gas ring 7 to produce a second set of excitation/dissociation reactions. An electrical potential (typically 13.56 MHz) may be applied using generator 11 to the electrode plate 1 in order to independently electrically bias the substrate 10. Secondary lower magnets 13 that are independently controlled my also be used to direct ions created in the microwave plasma 9 to the substrate 1 to influence the film properties. Control of substrate temperature may be provided by either resistive heater or fluid exchange methods. Chamber pressure is held constant through appropriate vacuum throttling methods.

Fluorocarbon precursor gases may be introduced into the upper chamber 2 through gas inlet 8 where they are dissociated by the microwave plasma 9 and subsequently transported to the substrate 10 area via diffusion. Radical species with sufficient lifetime reach the substrate where surface modification may occur. Alternatively, fluorocarbon precursor gases may be introduced into the lower chamber 6 through the gas ring 7 while a noble gas such as argon or helium is introduced into the microwave cavity 2 through gas inlet 8. Specific reactions that are enabled by the noble gas metastable energies that are available result in the preferred chemical species and bonding states at the substrate surface. The level of rf substrate bias may be independently controlled using generator 11. This adjustable bias and the fact that the fluorination occurs outside (remote or downstream) from the high energy plasma in the upper chamber allows for the minimization of surface reactions that can lead to non-favorable bonding configurations. This in combination with the other operating parameters can lead to unique film properties that are not obtainable with direct plasma fluorination methods where electron energies are so dispersed and unfavorable surface reactions so prevalent.

The high frequency (microwave) plasma coupled with the ECR technique provides for the creation of selective species that lend themselves to excellent film properties, such as mechanical durability. The high frequency remote processing method results in a surface layer modification (of diamond-like carbon or some other organic substrate material) having not only high fluorine concentration, but fluorine bonding that yields maximum ink repellency ($CF_2$ and $CF_3$ type bonding) with the additional benefit of being extremely durable (due to crosslinking with the substrate). If the process is continued for suitably long time periods (such an several hours) a thin fluoropolymer film is deposited, but the surface modified layer remains at the interface between the film and substrate providing exceptional mechanical durability.

By adjusting the plasma processing parameters, a fluoropolymer layer can be prepared with a significantly higher F/C ratio and wherein more of the fluorine exists in the $CF_2$ and $CF_3$ states, as cared to layers produced by processes of the prior art. In particular, by the method of the present invention, a plasma deposited fluoropolymer layer can be made wherein the F/C ratio in preferably from about 1.0 to about 2.5. More preferably, the F/C ratio is from about 1.2 to about 2.1, and even more preferably is from about 1.7 to about 2.1. In addition, the combined amount of $CF_2$ and $CF_3$ bonding may be from about 25 to about 100%; preferably from about 50 to about 100%; and more preferably from about 75 to about 100%.

In addition, because the fluoropolymer layer of the present invention is incorporated into the matrix of the organic substrate material and is not merely a soft fluoropolymer film deposit, improved coating lifetime can be realized. For example, using an embodiment of the present invention, a fluoropolymer layer of thickness of less than 30 angstroms can be formed on the surface of a substrate material through surface modification that has better coating lifetime than a pure fluoropolymer deposit as prepared using conditions of the prior art. Further deposition of a fluoropolymer film may occur on top of this surface treated fluoropolymer layer. The combination of this surface modified layer and the subsequently coated fluoropolymer film can be characterized by the effective thickness of fluorine from the top surface of the film to its final point of detection in the matrix of the substrate through analytical means. This effective thickness may range from greater than 0 angstroms to less than 5000 angstroms. Preferably, this effective thickness ranges from 10 angstroms to 2500 angstroms. More preferably, this effective thickness ranges from 10 angstroms to 100 angstroms.

The films of the present invention have higher advancing and receding contact angles for water and typical thermal ink jet inks, such as that contained in the print cartridge of the Xerox Model 4004 thermal ink jet printer, herein referred to as Xerox ink, than known plasma modified films, such as fluorinated diamond-like carbon as described in U.S. Pat. No. 5,073,785.

A contact angle measures the degree of beading of a liquid on a surface. A higher advancing contact angle indicates that a liquid will preferentially not wet the surface. A higher receding contact angle indicates that there will be easier removal of the liquid from a surface if it has been initially wetted. As a result, when using the layers of the present invention, for example as front face coatings for thermal ink jet printheads, ink will be discouraged from wetting the face of the printhead. Moreover, even if the film has been wetted by initial jet firings, a smaller amount of the ink will remain on the surface of the face due to more efficient retraction back into the nozzle openings.

By the method or the present invention, a plasma deposited fluoropolymer layer can be made wherein the advancing contact angle with Xerox ink is between 60 and 180 degrees; preferably between 80 and 180 degrees; and more preferably between 100 and 180 degrees. The receding contact angle with Xerox ink is between 50 and 180 degrees; preferably between 70 and 180 degrees and more preferably between 90 and 180 degrees.

Because of its high contact angles, the fluoropolymer layer of the present invention is particularly useful for segmented thermal ink jet devices that are capable of simultaneously printing with two or more different color inks. In segmented devices when printing with two colors, for example, each color occupies one-half of the die. When the segmented devices are used, ink mixing on the front face due to wetting may result in spots on the print medium that are not homogeneous. Because of the decrease in the amount of ink remaining on the film of the present invention, segmented devices utilizing the films may have less ink mixing. The fluoropolymer film of the present invention may also be utilized in other printhead devices/formats such as full-width, piezoelectric, high speed, etc., printhead devices.

The coating layer and process of the present invention are further defined by reference to the following illustrative examples.

EXAMPLES

Figure 4A:
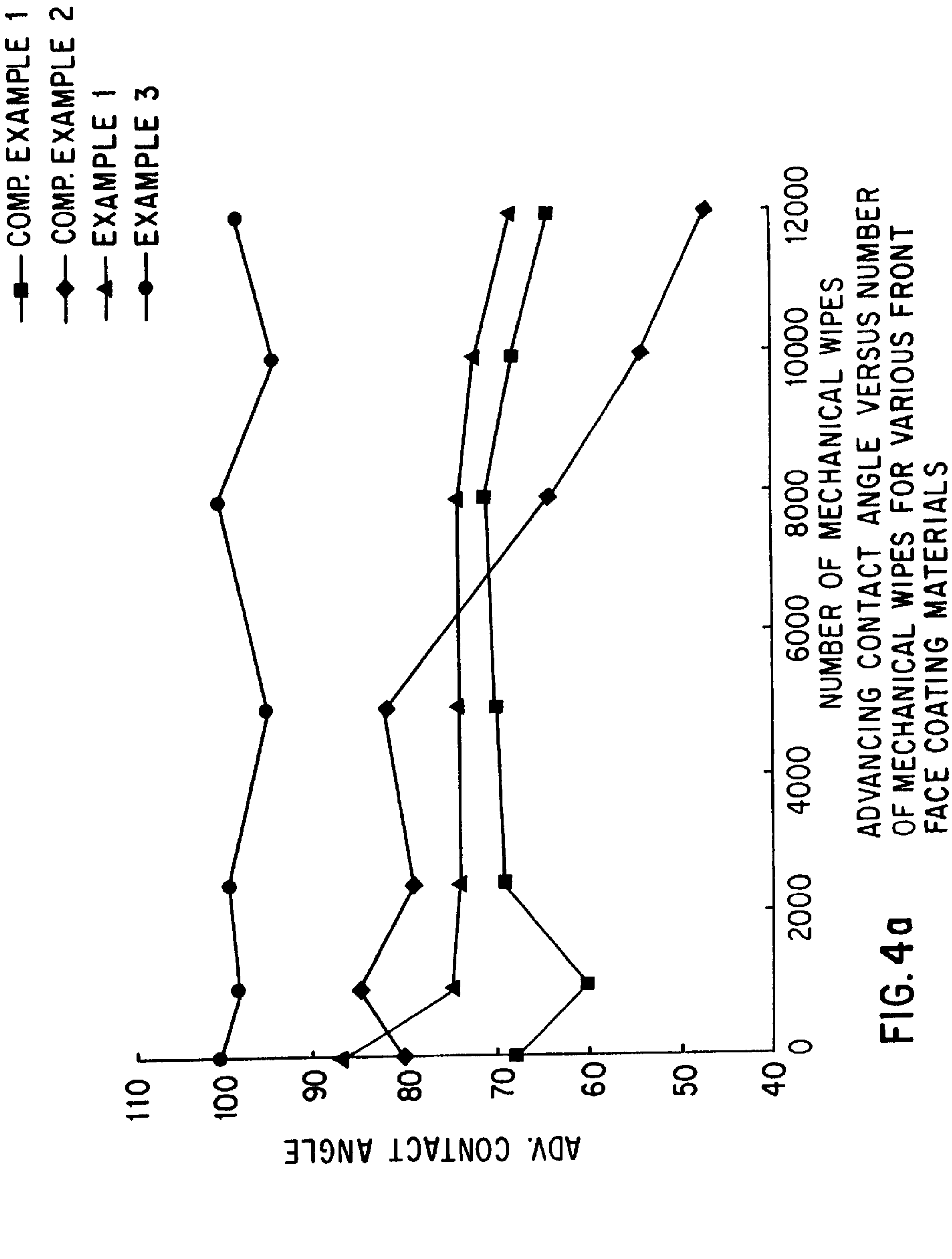
FIGS. 4A and 4B demonstrate the mechanical durability of high density remote plasma deposited fluoropolymer films compared with a direct low density plasma deposited fluoropolymer film and a direct low density plasma surface fluorinated layer.
Figure 4B:
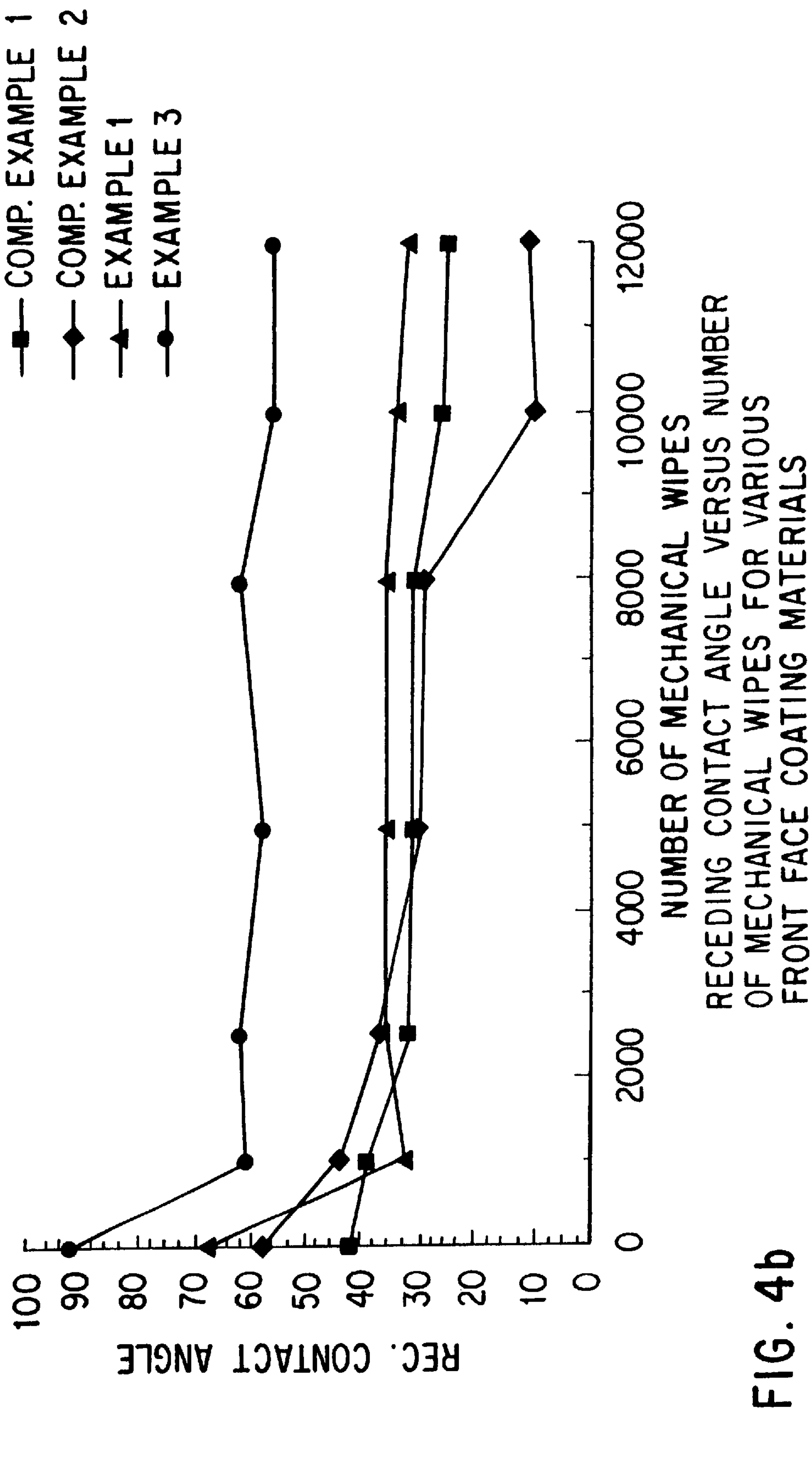

Contact angle measurements using the above-mentioned Xerox ink and X-ray photoelectron spectroscopy (XPS) surface composition analysis are performed to monitor the composition and ink repellency properties of the various examples. Results are tabulated in Tale 1. Evaluation of mechanical durability is performed using a test where contact angle is periodically monitored after an eslastomer wiper blade material (in this case polyurethane) has passed continuously over the surface of the fluoropolymer films. Results of such a test are obtained for the films of several of the examples and shown in FIGS. 4*a* and 4*b* for different processing conditions and 5*a* and 5*b* for different substrate materials.

Comparative Example 1

A lay of surface fluorinated diamond-like carbon is coated on crystalline silicon (c-Si) wafers according to the process of U.S. Pat. No. 5,073,785. The wafers are fixed in on appropriate support of a PECVD chamber such as that supplied by Plasma-Therm IP, Inc. (St. Petersburg, Fla.) under Model No. WAF'R Batch 700. The vacuum chamber is then evacuated to 1 mTorr and purged with $N_2$ for one hour while the substrates are heated to 250° C. After obtaining a base pressure of $1\times10^{-4}$ Torr, $N_2O$ is flowed into the chamber at a rate of 20 standard cubic centimeters per minute (sccm) and the pressure is allowed to stabilize at 200 mTorr. Radio frequency (rf) power (13.56 MHz) is then applied to the lower electrode (substrate table) at a level of 120 W for 30 minutes. This process cleans the substrate of organic residue and promotes adhesion of the subsequent deposited diamond-like carbon film.

Upon termination of the rf power, the $N_2O$ gas flow is discontinued and replaced by a mixture of $C_2H_4$ and Ar at a flow ratio of 30:15 sccm. The pressure in allowed to stabilize at 200 mTorr and 100 W rf power is applied to the lower electrode for 10 minutes to allow for diamond-like carbon film growth (0.25 $\mu$m). Upon termination of the rf power, the $C_2H_4$ and Ar gas flows are discontinued and $CF_4$ is introduced into the vacuum chamber and the pressure is allowed to stabilize at 300 mTorr. Radio frequency power at 75 W is applied to the upper electrode for 30 seconds creating plasma that modifies the surface of the diamond-like carbon layer rendering it stable and hydrophobic. After purging for several minutes, the system is vented and the samples evaluated. The results are presented in Table 1 and FIGS. 4*a* and 4*b*.

comparitive Example 2

In this comparative example a fluoropolymer film is deposited by a low density direct plasma method as taught in copending patent application Ser. No. 08/369,439. crystalline silicon substrates coated with diamond-like carbon on prepared in Comparative Example 1 are placed in a PECVD chamber of a system such as that supplied by Plasma-Therm I.P., Inc. (St. Petersburg, Fla.) under the Model No. WAF'R Batch 700. In this case however the layer of surface fluorination provided by the $CF_4$ plasma in comparative Example 1 has not been done. The chamber is evacuated to 1 mTorr while it is purged with $N_2$ for 4 hours and the substrates are heated to 100° C. After reaching a base pressure of $1\times10^{-4}$ Torr, 20 sccm of $C_2F_4$ (tetrafluoroethylene) are introduced into the chamber and the pressure is allowed to stabilize at 200 mTorr. Radio frequency power (13.56 MHz) at 20 W in applied to the upper electrode for 30 minutes resulting in the deposition of 0.25 μm of fluoropolymer film on the substrates. Upon termination of the rf power, the system is purged for several minutes and then vented to allow for sample evaluation.

Example 1

The Plasma-Therm SLR-770 ECR system available from Plasma-Therm I.P., Inc. (St. Petersburg, Fla.) as shown in FIG. 3 is used for high density remote plasma fluoropolymer layer deposition. Substrates are c-Si pieces coated with diamond-like carbon as prepared in Comparative Example 2. Substrate temperature is maintained at 40° C. Argon (20 sccm) is introduced into the ECR section of the upper chamber through gas inlet 8. The gas dispersal ring 7 in the lower chamber 6 is placed 2¼" above the plane of the substrate table 1. Hexafluoropropylene ($C_3F_6$) is introduced through the gas ring 7 at 5 sccm. The chamber pressure is held constant at 75 mTorr. An rf bias of 1 W is applied to the substrate table using rf generator 11. The electromagnets 12 are set at 150 Å to induce the SCR condition. The lower magnets 13 are set at 0 Å. A microwave power of 150 W is then applied for 10 minutes using generator 3. After this time, the power and magnetic field is discontinued and the gas flows shut off. The resulting fluoropolymer layer measures 20 angstroms. Results are shown in Table 1 and FIGS. 4*a* and 4*b*.

Example 2

The Plasma-Therm SLR-770 ECR system as shown in FIG. 3 is used for fluoropolymer layer deposition. Substrates are c-Si pieces coated with diamond-like carbon as prepared in Comparative Example 2. Substrate temperature is maintained at 40° C. Argon (10 sccm) is introduced into the ECR section of the upper chamber through gas inlet 8. The gas dispersal ring 7 in the lower chamber 6 is placed 2¼" above the plane of the substrate table 1. Perfluoropropane($C_3F_6$)is introduced through the gas ring 7 at 10 sccm. The chamber pressure is hold constant at 75 mTorr. An rf bias of 1 W is applied to the substrate table using rf generator 11. The electromagnets 12 are set at 150 Å to induce the ECR condition. The lower magnets 13 are set at 0 Å. A microwave power of 150 W is then applied for 10 minutes using generator 3. After this time, the power and magnetic field is discontinued and the gas flows shut off. The resulting fluoropolymer layer measures 20 angstroms. Results are shown in Table 1.

Example 3

The Plasma-Therm SLR-770 ECR system as shown in FIG. 3 is used for fluoropolymer layer deposition. Substrates are c-Si pieces coated with diamond-like carbon as prepared in Comparative Example 2. Substrate temperature is maintained at 40° C. Perfluoropropane($C_3F_6$)is introduced into the ECR section of the upper chamber at 10 sccm through gas inlet 8. No gas is introduced through the gas ring 7. The chamber pressure ii held constant at 90 mTorr. An rf bias of 1 W in applied to the substrate table using rf generator 11. The electromagnets 12 are set at 150 Å to induce the ECR condition. The lower magnets 13 are set at 0 Å. A microwave power of 150 W is then applied for 10 minutes using generator 3. After this time, the power and magnetic field is discontinued and the gas flows shut off. The resulting fluoropolymer layer measures 30 angstroms. Results are shown in Table 1 and FIGS. 4*a* and 4*b*.

Example 4

Figure 5A:
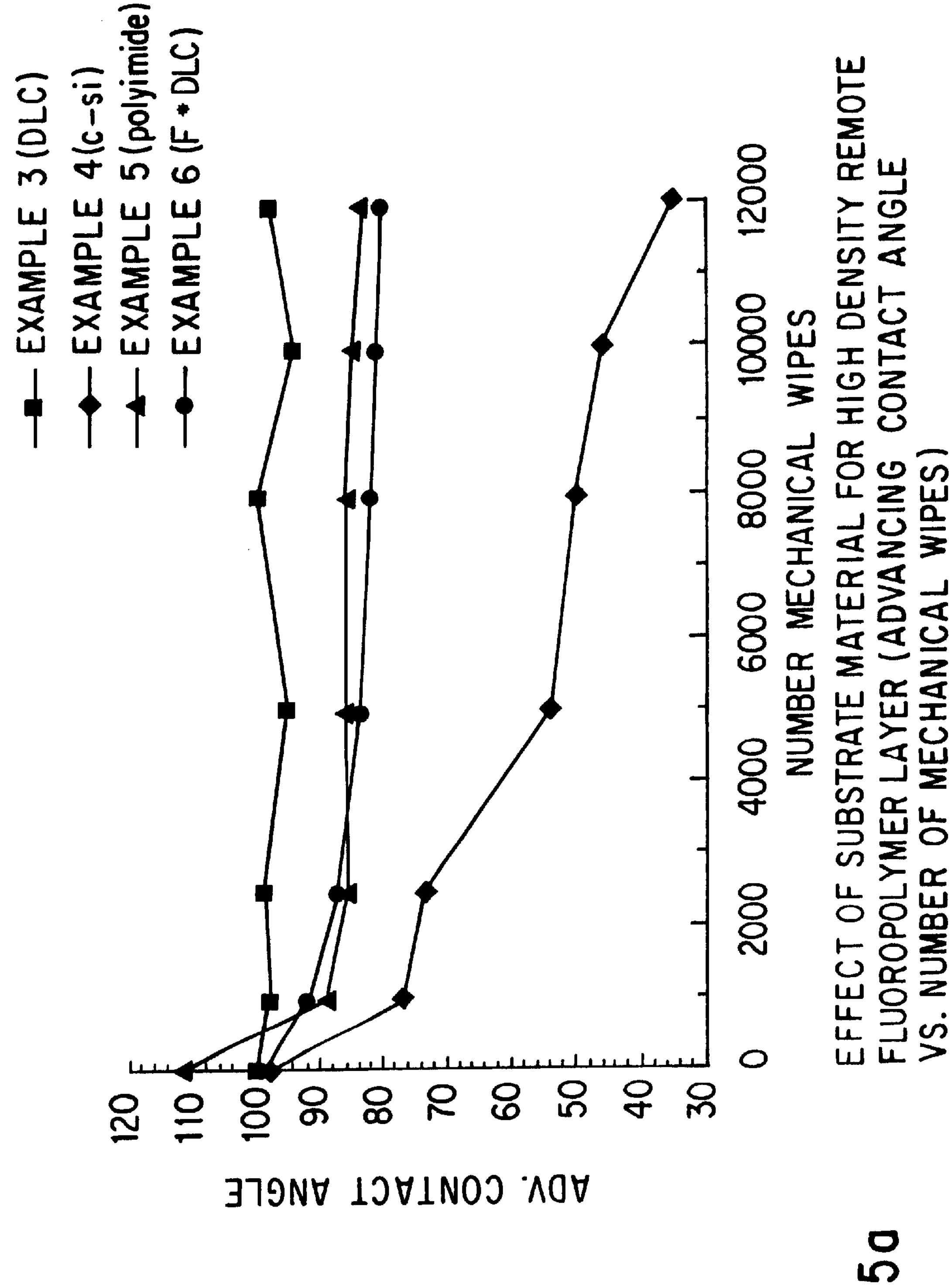
FIGS. 5A and 5B demonstrate the mechanical durability of high density remote plasma deposited fluoropolymer films on various substrates.
Figure 5B:
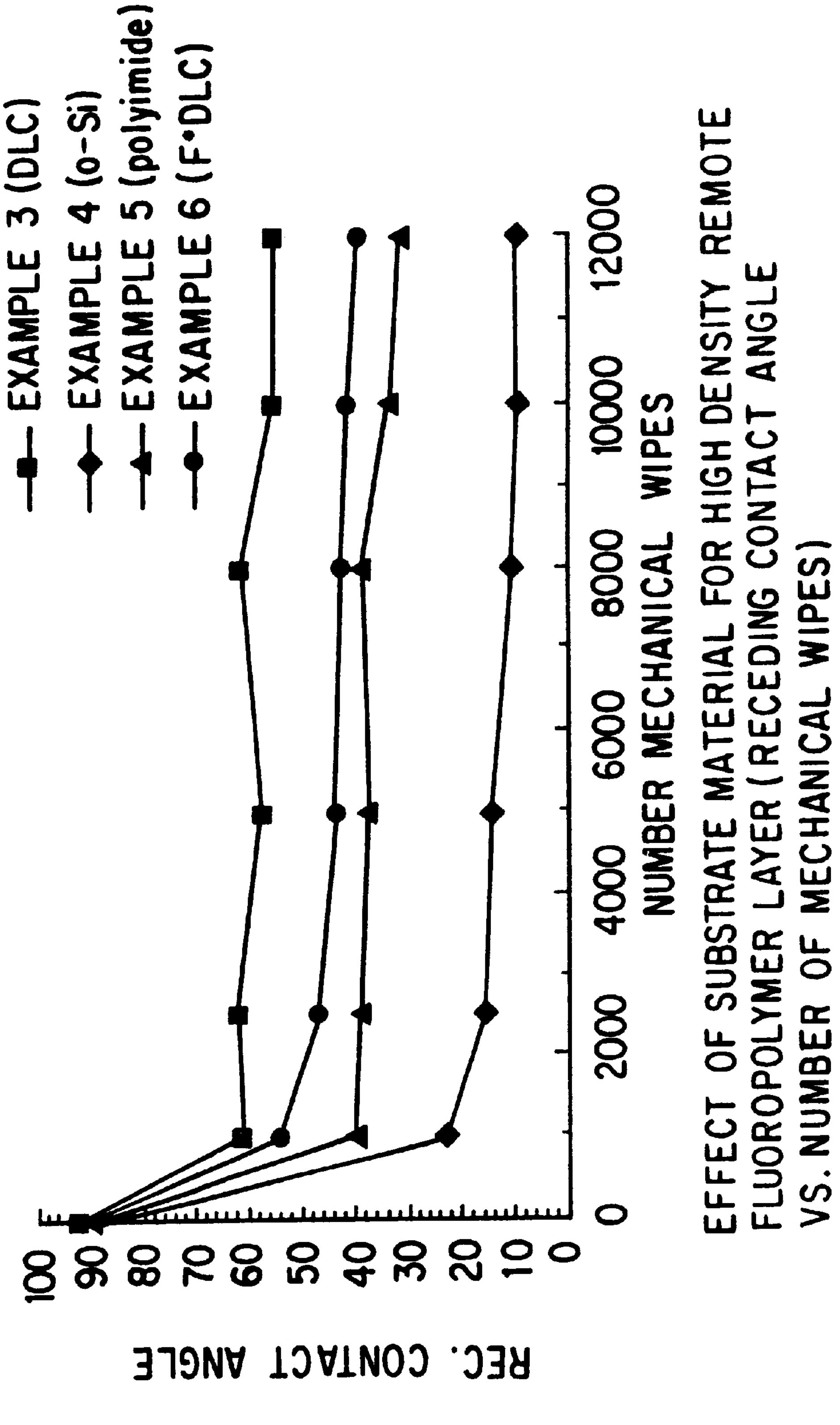

The process or Example 3 is carried out, but with bare crystalline silicon as the substrate 10 with no diamond-like carbon intermediary layer. Results are shown in Table 1 and FIGS. 5*a* and 5*b*. The resulting fluoropolymer layer measures 20 angstroms.

Example 5

The process or Example 3 is carried out, but with a spin coated layer of polyimide on crystalline silicon as the substrate material 10. Results are in Table 1 and FIGS. 5*a* and 5*b*. The resulting fluoropolymer layer measures 30 angstroms.

Example 6

The process of Example 3 is carried out, but with a layer of fluorinated diamond-like carbon as prepared in Comparative Example 1 as the substrate 10. Results are shown in Table 1 and FIGS. 5*a* and 5*b*. The resulting fluoropolymer layer measures 30 angstroms.

Compared to the material of Comparative Example 1 where the fluorination is accomplished using a direct $CF_4$ plasma, the high density remotely fluorinated samples (Examples 1 through 6) all have higher fluorine content and increased concentration of preferred $CF_2$ and $CF_3$ type bonds. This results in higher contact angle values and ultimately better effectiveness as a thermal ink jet front face coating.

TABLE 1

Contact Angle and Surface Composition of Plasma Deposited Front Face Coatings

| Example | Substrate | Fluorination method | Fluorination Source Gas | P/C | % C—C | % CF | $CF_3$ | % $CF_3$ | Adv. Contact Angle | Rec. Contact Angle |
|---|---|---|---|---|---|---|---|---|---|---|
| Comp. 1 | DLC | low density, direct | CF4 | 0.3 | 49 | 39 | 7 | 4 | 68 | 42 |
| Comp. 2 | DLC | low density, direct | C2F4 | 1.5 | 8 | 53 | 31 | 18 | 89 | 58 |
| 1 | DLC | high density, remote, Ar* induced | C3F6 | 1.2 | 26 | 27 | 38 | 9 | 87 | 67 |

TABLE 1-continued

Contact Angle and Surface Composition of Plasma Deposited Front Face Coatings

| Example | Substrate | Fluorination method | Fluorination Source Gas | P/C | % C—C | % CF | $CF_3$ | % $CF_3$ | Adv. Contact Angle | Rec. Contact Angle |
|---|---|---|---|---|---|---|---|---|---|---|
| 2 | DLC | high density, remote, Ar* induced | C3F6 | 1.2 | 38 | 17 | 39 | 6 | 102 | 66 |
| 3 | DLC | high density, remote | C3F6 | 2.8 | 0 | 8 | 76 | 15 | 100 | 92 |
| 4 | C-51 | high density, remote | C3F6 | 2.0 | 0 | 0 | 76 | 15 | 99 | 91 |
| 5 | polyimide | high density, remote | C3F6 | 2.0 | 0 | 8 | 76 | 15 | 122 | 91 |
| 6 | F.CLC | high density, remote | C3F6 | 2.0 | 0 | 0 | 76 | 13 | 99 | 92 |

Although the ink repellency of the fluoropolymer film of Comparative Example 2 is excellent at the start of the mechanical durability test, it quickly degrades as the mechanically poor film is abraded away by the wiper blade material. The surface fluorinated layer of Comparative Example 1 has much lower ink repellency than the fluoropolymer film of Comparative Example 2 due to the relative fluorine deficiency. Stability of the ink repellency however is improved compared to the fluoropolymer film of Comparative Example 2 because the fluorine which is incorporated in the surface layer is directly bonded to the mechanically durable diamond-like carbon matrix and is not in the form of a poorly cross-linked polymer. By comparison, the high density remotely deposited layers of Examples 1 and 3 provide excellent ink repellency at the start of the test due to their high concentration of $CF_2$ and $CF_3$ at the surface and show excellent long term durability because these species are able to chemically bond at the surface of the substrate due to the benefits of the current process.

Table 1 indicates that the initial ink repellency of the fluoropolymer film deposited in Examples 3 through 6 is independent of substrate nature except for the polyimide substrate. This is due to the presence of a thin, but homogeneous film at the surface, similar to what is prepared in Comparative Example 2. However as this film is abraded away in the mechanical durability test (FIGS. 5*a* and 5*b*), the substrate becomes critically important and ultimately determines the long term properties of the material. Crystalline silicon (Example 4) does not form a stable surface layer when fluorinated in the plasma and thus has poor durability.

Long term performance is also degraded when a prefluorinated diamond-like carbon film is used as the substrate. This is to be expected because the fluorinated diamond-like carbon material has already been passivated with a $CF_4$ plasma, causing the unsaturated bonds to no longer be available when the microwave/ECR process takes place and hence, the poorer results.

The polyimide substrate shows a higher advancing contact angle compared to the other substrates, but this is not due to differences in the fluoropolymer film at the surface (as evidenced by the XPS data), but due to the nature of the polyimide substrate material being rougher than the other examples. Even the diamond-like carbon substrate shows the initial drop in receding contact angle at the start of the test, but quickly stabilizes as the surface modified layer is reached.

This data demonstrates that the microwave remote plasma process results in not just a simple fluoropolymer deposition (otherwise it would wipe away easily as with the c-Si substrate sample) but also a surface modification of the substrate (provided it is organic in nature). This leads to enhanced durability while still providing much better hydrophobicity over just surface fluorinated diamond-like carbon coatings, due to the nature of the passivating species created in the microwave/ECR plasma. Due to its ability to be effectively fluorinated and provide subsequent long term mechanical stability, diamond-like carbon is the preferred substrate material for high density remote plasma fluorination.

It is apparent that the fluoropolymer films prepared using a remote microwave/ECR plasma method, have better ink repellency and durability than films obtained from the prior art. This repellency can be attributed to not only the higher concentration or fluorine, but also to the prudence of preferred bonding types, i.e., $CF_2$ and $CF_3$, resulting from the unique conditions of the microwave ECR plasma. Because of its superior properties, the film of Example 3 is a preferred embodiment of the present invention.

Example 6

Xerox thermal ink jet die modules as are used in the Xerox 4004 are used as substrates for a front-face coating while using processing conditions as in Comparative Example 1, Comparative Example 2 and Example 3. After the respective front face coating processes are completed along with appropriate electrical and ink handling packaging, these devices are utilized in a printing process using the above-mentioned Xerox ink contained in cartridges of a Xerox Model 4004 ink jet printer available from Xerox Corporation.

Observation of the front face during jet firing reveals significant flooding of the front face and pooling around the nozzles of the printhead of Comparative Example 1. This results in poor directionality and smearing of the inks on the print paper. The front face of the die modules of Comparative Example 2 shows excellent front face ink repellency and subsequent print quality during initial stages of evaluation.

However, following approximately 1000 wipe cycles in a maintenance station representative of that in the Xerox 4004 printer, visible streaks appear in the fluoropolymer coating and ink wetting around the nozzles of the device is prominent. Related degradation in print quality is observed. In contrast, the printhead with the high density rely fluorinated coating of Example 3 results in no face flooding and virtually no wetting around the nozzle openings even when operating at up to 7 kHz firing frequency. Resulting print quality is excellent. This performance is maintained even after 10,000 wipe cycles in the maintenance station.

What is claimed is:

1. A method for remote plasma deposition of a fluoropolymer film on an ink jet printhead that is to have ink supplied to it and contains on array of nozzles terminating on a front face, the front face of the ink jet print head having a first layer composed predominately of diamond-like carbon, comprising:

dissociating fluorocarbon precursor gas or gases to form a remote plasma containing dissociated fluorocarbon species;

transporting said species to the front face of the ink jet printhead via diffusion; and depositing said species onto the first layer of the ink jet printhead to form an ink repellent layer composed predominately of a fluoropolymer and in which at least 25% of fluorine on the surface of the ink repellent layer is in the form of a combination of $CF_2$ and $CF_3$ bonds, thereby forming a two layer plasma deposited film structure to achieve the ink repellent function so that at least the portion of the front face in the vicinity of the repels said ink.

2. A method according to claim 1, wherein said remote plasma is created using microwave, radio frequency, electron cyclotron resonance, inductive coupling or helicon wave generation, or combinations thereof.

3. A method according to claim 1, wherein said remote plasma has electron and ion densities of greater than $10^{11}$/cm$^3$.

4. A method according to claim 1, wherein said fluorocarbon precursor gas or gases are selected from the group consisting of $C_3F_8$, $C_2F_6$, $C_3F_6$, or $C_2F_4$.

5. A method according to claim 1, wherein said ink jet printhead comprises diamond-like carbon, polyamide, polysulfone, polyimide or polyketone.

6. A method for remote plasma deposition of a fluoropolymer film on an ink jet printhead that is to have ink supplied to it and contains on array of nozzles terminating on a front face, the front face of the ink jet print head having a first layer composed predominately of diamond-like carbon, comprising:

forming a remote plasma;

transporting reactive species of said plasma by diffusion to fluorocarbon precursor gas or gases in order to dissociate said fluorocarbon gas or gases; and depositing said dissociated fluorocarbon gas or gases onto the first layer of the ink jet printhead to form an ink repellent layer composed predominately of a fluoropolymer and in which at least 25% of fluorine on the surface of the ink repellent layer is in the form of a combination of $CF_2$ and $CF_3$ bonds, thereby forming a two layer plasma deposited film structure to achieve the ink repellent function so that at least the portion of the front face in the vicinity of the nozzles repels said ink.

7. A method according to claim 6, wherein said remote plasma is of excited noble gas.

8. A method according to claim 7, wherein said excited noble gas is argon or helium.

9. A method according to claim 6, wherein said remote plasma is created using microwave, radio frequency, electron cyclotron resonance, inductive coupling or helicon wave generation, or combinations thereof.

10. A method according to claim 6, wherein said remote plasma has electron and ion densities of greater than $10^{11}$/cm$^3$.

11. A method according to claim 6, wherein said fluorocarbon precursor gas or gases are selected from the group consisting of $C_3F_8$, $C_2F_6$, $C_3F_6$ or $C_2F_4$.

12. A method according to claim 6, wherein said ink jet printhead comprises diamond-like carbon, polyamide, polysulfone, polyimide or polyketone.

* * * * *